(12) United States Patent
Zucker et al.

(10) Patent No.: US 12,177,171 B2
(45) Date of Patent: *Dec. 24, 2024

(54) AUTO-INITIATED MESSAGING CHAT

(71) Applicant: NCR Voyix Corporation, Atlanta, GA (US)

(72) Inventors: Brent Vance Zucker, Roswell, GA (US); Mehtab Chithiwala, Lawrenceville, GA (US); Yehoshua Zvi Licht, Alpharetta, GA (US); Kelly Gernatt Martinez, Marietta, GA (US); Pahul Singh Matharu, San Jose, CA (US); Yongching Tee, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,896

(22) Filed: Mar. 15, 2023

(65) Prior Publication Data

US 2023/0216813 A1 Jul. 6, 2023

Related U.S. Application Data

(60) Continuation of application No. 17/469,122, filed on Sep. 8, 2021, now Pat. No. 11,671,384, which is a (Continued)

(51) Int. Cl.
*H04L 51/02* (2022.01)
*G06F 40/284* (2020.01)
(Continued)

(52) U.S. Cl.
CPC ............ *H04L 51/02* (2013.01); *G06F 40/284* (2020.01); *G06F 40/30* (2020.01); *G06N 3/004* (2013.01);
(Continued)

(58) Field of Classification Search
CPC ......... H04L 51/02; H04L 51/04; H04L 51/52; H04L 67/306; H04L 67/535; G06Q 30/01; G06F 40/284; G06F 40/30; G06N 3/004
See application file for complete search history.

(56) References Cited

U.S. PATENT DOCUMENTS

| 11,671,384 B2 * | 6/2023 | Zucker | H04L 51/02 |
| | | | 709/206 |
| 2008/0015887 A1 * | 1/2008 | Drabek | G06Q 30/0601 |
| | | | 705/26.1 |

(Continued)

*Primary Examiner* — Soe Hlaing
(74) *Attorney, Agent, or Firm* — Schwegman Lundberg & Woessner, P.A.

(57) ABSTRACT

An autonomous chat bot monitors actions of users on a messaging platform and generates self-initiated chat sessions with the user to gauge users' interest and intent with respect to a target subject matter and the conversations of the chat sessions. Based on the gauged interest and intent, profiles or preferences are generated for the users independent of or relevant to the target subject matter. In an embodiment, customer contact information for the users are provided by the autonomous chat bot to a Customer Relationship Management (CRM) system for further engaging the customer with respect to the target subject matter or other subject matters determined to be relevant from the profiles or preferences

19 Claims, 5 Drawing Sheets

Related U.S. Application Data continuation of application No. 16/720,453, filed on Dec. 19, 2019, now Pat. No. 11,196,688, which is a division of application No. 15/445,269, filed on Feb. 28, 2017, now Pat. No. 10,594,633.

(51) Int. Cl.
| | |
|---|---|
| *G06F 40/30* | (2020.01) |
| *G06N 3/004* | (2023.01) |
| *G06Q 30/01* | (2023.01) |
| *H04L 51/04* | (2022.01) |
| *H04L 51/046* | (2022.01) |
| *H04L 51/52* | (2022.01) |
| *H04L 67/306* | (2022.01) |
| *H04L 67/50* | (2022.01) |

(52) U.S. Cl.
CPC .............. *G06Q 30/01* (2013.01); *H04L 51/04* (2013.01); *H04L 51/046* (2013.01); *H04L 51/52* (2022.05); *H04L 67/306* (2013.01); *H04L 67/535* (2022.05)

(56) References Cited

U.S. PATENT DOCUMENTS

| | | | | |
|---|---|---|---|---|
| 2013/0275862 | A1* | 10/2013 | Adra | ............ H04L 51/046 715/234 |
| 2018/0189857 | A1* | 7/2018 | Wu | ............ G06F 40/30 |

* cited by examiner

AUTO-INITIATED MESSAGING CHAT

CROSS-REFERENCE TO RELATED APPLICATION

This application is a continuation of U.S. patent application Ser. No. 17/469,122, filed Sep. 8, 2021, which is a continuation of U.S. patent application Ser. No. 16/720,453, filed Dec. 19, 2019, now U.S. Pat. No. 11,196,688, which is a division of U.S. patent application Ser. No. 15/445,269, filed Feb. 28, 2017, now U.S. Pat. No. 10,594,633 which applications and publications are incorporated herein by reference in their entirety.

Individuals and businesses utilize a variety of messaging technologies to: socialize, communicate, arid engage in business activities. Some of these messaging technologies include: email platforms, text platforms, instant messaging platforms, browser-based platforms, automated voice-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

Different individuals prefer some messaging platforms over others. This creates a significant challenge for a business that wishes to engage their customers in seamless and automated manners on the messaging platforms that each customer prefers to use. The problem is compounded because each customer may prefer a different messaging platform depending on the device that the customer is operating at any given point in time (such as a laptop versus phone, a watch versus phone, etc.).

Most businesses also have a presence on social media messaging platforms and have some customers that follow them or engage them from their sites. Over the years popup ads have lost their initial effectiveness that businesses once enjoyed and many modern browsers substantially prevent pop up ads today.

Successful sales are often the result of contacting a potential customer that has shown an interest in a service or product of the business. However, trying to reach out to large numbers of potential customers through phone-based sales calls In attempts to make sales is extremely time consuming with a low sales success rate (largely because most customers contacted on the large list of leads have no real interest in the services or products to begin with). And yet, the industry continues to inundate the public because cold calling does produce sales albeit with low success rates. The industry appears to have grown, resulting in many uninterested members of the public complaining and demanding regulations and laws to substantially restrict, if not prohibit, the practice.

Thus, businesses spend large sums of money on cold calling sales staff as well as a substantially amount of money lobbying public officials to not restrict the practice.

SUMMARY

In various embodiments, methods and a system for auto-initiated messaging chats are presented.

According to an embodiment, a method for an auto-initiated messaging chat is provided. Specifically, and in one embodiment, activity of a user on a messaging platform is matched to criteria. A chat session is automatically initiated with the user on the messaging platform with respect to a subject matter linked to the criteria. Finally, a level of interest for the user in the subject mailer is gauged based on at least one response provided by the user during the chat session.

DETAILED DESCRIPTION

Figure 1A:
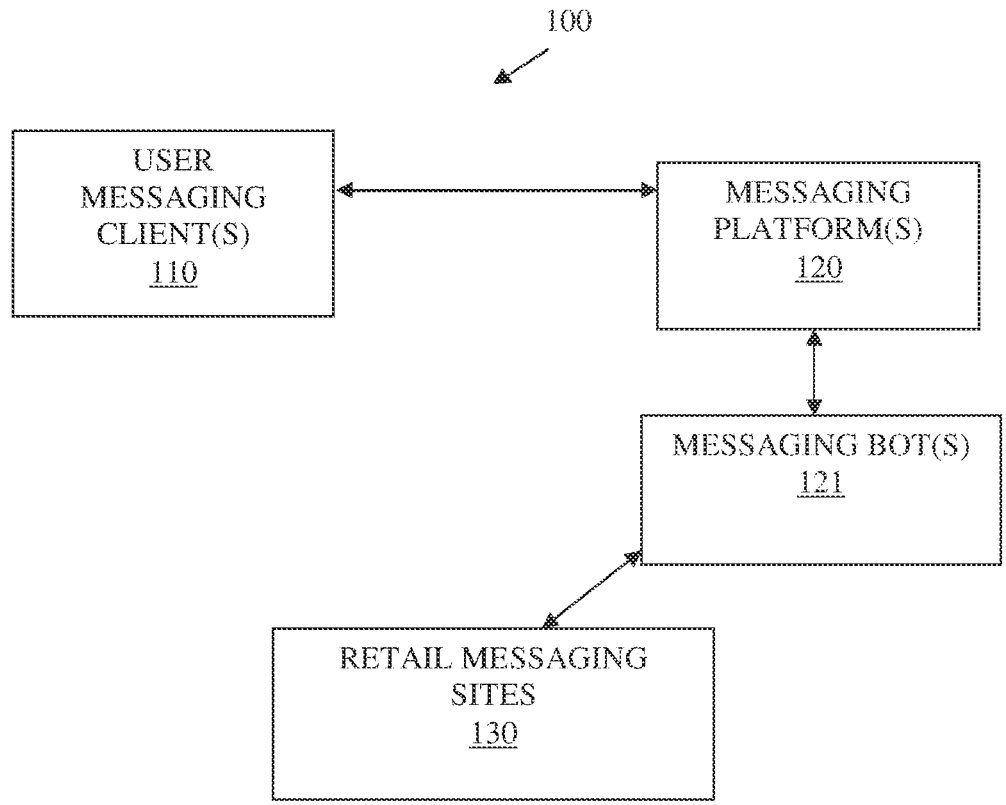
FIG. 1A is a diagram of a system for auto-initiated messaging chats, according to an example embodiment.

FIG. 1A is a diagram of a system 100 (or auto-initiated messaging chats, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the auto-initiated messaging chat techniques presented herein and below.

Moreover, various components are illustrated as one or more software modules, which reside in non-transistory storage and/or hardware memory as executable instructions that when executed by one or more hardware processors perform the processing discussed herein and below.

The techniques, methods, and systems presented herein and below for auto-initiated messaging chats can be implemented in all, or some combination of the components shown in different hardware computing devices having one or more hardware processors.

The system 100 includes: one or more messaging clients 110, one or more messaging platforms 120, one or more automated messaging bots 121, and one or more retail messaging sites 130.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, a Virtual Reality (VR) headset, a device that is part of the internet-of-Things (IoTs), etc.

As used herein, a "messaging platform" refers to the software, interfaces, APIs, processing devices, and network connectivity used to perform messaging communications by users. A messaging platform includes, by way of example only, email, Short Message Service (SMS) text, instant message, voice-based applications (e.g., Amazon Echo™, Google Home™, etc.), social-media applications (e.g., Facebook™, Slack™, Twitter™, Instagram™, Snap Chat™, LinkedIn™, Skype®, Kik™, Google Allo®, Line™, a variety of match making services, etc.), VR-based applications, and the like.

As used herein, a "messaging bot" 121 of "bot" 121 refers to a software application that is designed to engage in messaging activities in an automated manner as an active or passive participant within a specific messaging platform 121 tor a specific conversation or within multiple disparate messaging platforms 121 for a specific conversation or a set of types of conversations. A messaging bot 121 is a logical participant in a given chat session (messaging session or dialogue) or conversation for any given messaging platform. Moreover, a messaging bot 121 is configured to perform a variety of pre-configured automated actions within messaging platforms and/or outside the messaging platforms.

A "conversation" is a specific type of chat session that a bot 121 has engaged in to perform some service based on a derived "intention" of the conversation. Therefore, the conversation includes a subject matter that the bot 121 is able to decipher from interaction with a user in the chat session, with the subject matter leading to a perceived intention of the user during the chat session. The intention leading to additional actions that may be taken by the bot 121 outside or out-of-band with the chat session in a given messaging platform 120.

The conversation and intention can be determined through existing natural language processing techniques and can include speech of the user in the chat session, video images of gestures taken by the user during a chat session, VR actions taken or implied by the user during a VR session, and/or text (or various combinations of speech, gestures, actions, and written text).

Conversations are auto-initiated in an autonomous manner by the bot 121. Typically, bots do not autonomously initiate chat session over messaging platforms with users; thus, the manners in which the bots 121 determine to autonomously initiate chat session with users on messaging platforms 120 and the subsequent actions taken by the bots 121 within the messaging platforms 120 or out-of-band to the messaging platforms 120 are unique to various embodiments of the invention presented herein.

In an embodiment, the messaging client 110 (is also referred to as a "messaging application (app)" 110) includes no software changes or modifications for interaction with the bot 121 to be operational and perform the processing discussed herein and below. That is, from the perspective of the messaging platform 120 and the messaging app 110, the messaging bot 121 (also referred to as "messaging bot 121 or bot 121, herein) is a real user or participant (albeit the bot 121 is a logical participant) that processes an existing API of the messaging platform 120 to appear as a participant.

In an embodiment, it is to be noted that the bot 121 need not processing on a same device as the corresponding messaging app 110. So, a bot 121 can engage a user through the users messaging app 110 on the user's operated device by being engaged for a chat session at the direction of the user or auto-engaged (initiated) based on the autonomous decision of the bot 121. The bot 121 may include a valid unique-user identifier and account for the messaging platform 120 that the bot 121 is active within. The actual device that executes the bot 121 can be a server or cloud (set of logically cooperating servers).

In some embodiments, the bot 121 may process within the local processing contexts and on the devices that process the corresponding messaging apps 110.

One benefit by retaining the bot 121 in a cloud processing environment is that any updates and enhancements to the bot 121 can be achieved without updates to the devices having the messaging app 110. Furthermore, a single base version of the bot 121 can exist in the cloud and support multiple disparate users through use of user-customization profiles that include user-specific configurations of the bots 121. In this manner, when a specific user identifies or indirectly causes the bot 121 to engage from the user's messaging app 110, a cloud service can cause the base bot to be initiated and apply the that user's specific preferences/configurations to create a running instance of the bot 121 that is specific and customized to the user (based on the user's identifier for the messaging platform 120).

In an embodiment, the bot 121 is configured to process automated conversations of a particular conversation type or subset of conversation types. In an embodiment, the bot 121 is configured to process over a specific messaging platform 120 or processes over a sot of disparate messaging platforms 120. In an embodiment, the bot 121 is configured to process a specific conversation type over a specific messaging platform 120.

The bot 121 auto-initiates or autonomously derives the conversation type and specific details of the conversation with a user and without any prior direct interaction with a user. The bot includes API interlaces to receive data metrics in real time with respect to a site of a given messaging platform 120.

That is, a particular enterprise or business includes a messaging platform account with a particular messaging platform 120. The account includes a website (site), page, or web address 130 with which the enterprise or business maintains a presence for the messaging platform. APIs of the messaging platform 120 provided metrics in real time to the enterprise account. The enterprise account may also maintain within the messaging platform 120 or external to the messaging platform history of these metrics. The metrics can include a messaging account identifier for a visitor (user) to the site 130, date and time of access, resource accessed (file, application, link of the website), length of stay on the site or length of access on a resource, and other messaging platform-available metrics. The bot 121 includes access to these metrics and can register for real-time notification when metrics are generated from the site 130 through activity of a user on the site 130. This allows the bot 121 to monitor the site 130 of the enterprise within the messaging platform.

Figure 1B:
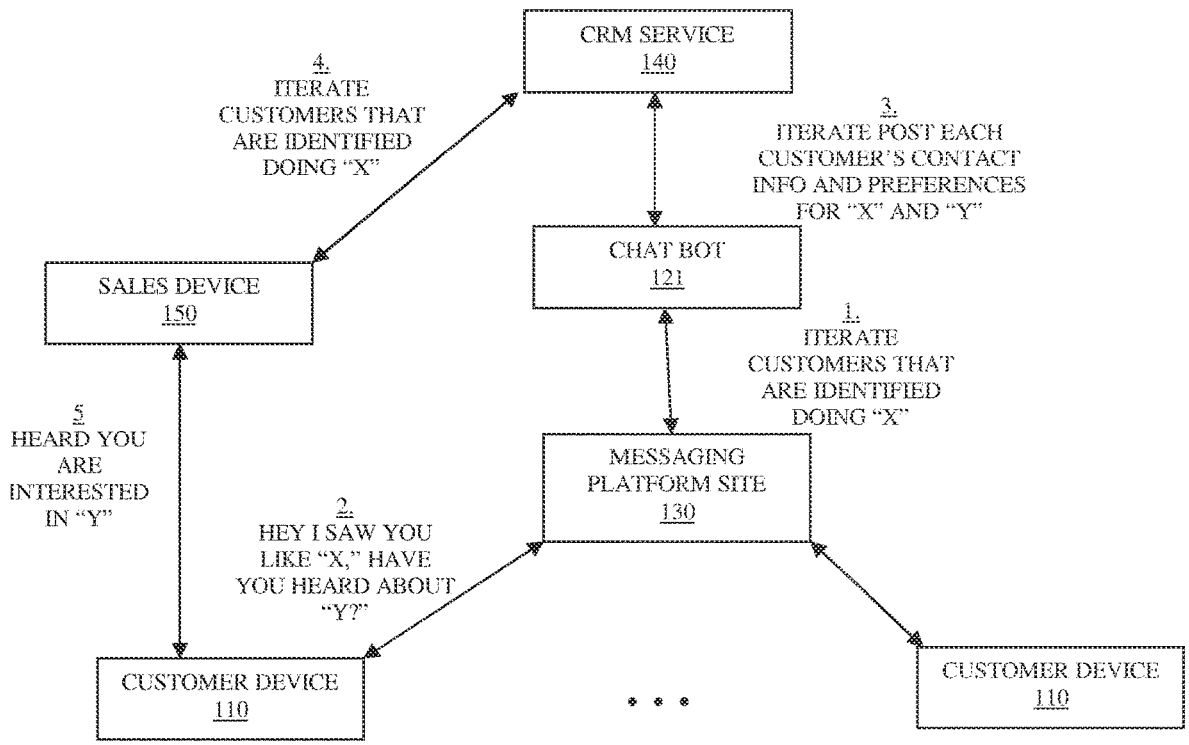
FIG. 1B is a diagram of a sample processing flow for the system of the FIG. 1A, according to an example embodiment.

FIG. 1B is a diagram of a sample processing flow for the system 100 of the FIG. 1A, according to an example embodiment.

The bot 121 is also configured with an API for interaction with a Customer-Relationship Management (CRM) service 140 maintained by the enterprise or maintained by a contracted third-party service on behalf of the enterprise. As customers visit the site 130 of the enterprise within the messaging platform the customer operated devices 110 (that include the messaging clients 110), the bot 121 receives real-time metrics through the messaging platform's API and is activated to evaluate the activity of the users operating the customer devices 110. (As used herein the terms: "user," consumer," and "customer" may be used interchangeably and synonymously.)

The bot 121 receives a configuration for recognizing activity of the user on the site 130 as a particular interest being exhibited by the user, such as an interest in a product or service of the enterprise. For example, an NBA enterprise site 130 may include scores of a particular NBA team, such that the bot 121 active on the site 130 is configured to save a user messaging platform identifier for a user that visits the site 130 and clicks on a link for the score of a game with a predefined regularity or frequency. When the frequency for a given user is noted, the bot 121 engage the user to save a push notification for the NBA's team score.

The bot 121 may also be configured to evaluate the site metrics using Artificial Intelligence (AI) algorithms to identify patterns of activity on the site 130 that determine a specific conversation type, which the bot 121 autonomously generating a specific conversation type in a chat session with the user.

That is, the CRM service or an API algorithm can be used to configure an API of the bot 121 to recognize patterns and auto-engage a user in a bot-initiated chat session through the messaging platform 120.

If the intention of the user during that bot-initiated chat session is favorable (based on selections, responses, or actions of the user), then the bot 121 provides a bot generated profile with contact information to the CRM service 140 through the bot's API with the CRM service 140.

The CRM Service 140 then pushes preferences or profiles generated by the bot 121 for the user to sales people operating sales devices 150, which match the preferences or profiles to consumer types (segments) deemed to be receptive to a particular good or service of the enterprise. The sales person may then call the consumer/user (if a phone number is available) to pitch the good or service or engage the user in a separate chat session through the messaging platform 120.

This allows the enterprise to produce a highly efficient contact list for potential users that are likely to be receptive to the goods and services of the enterprise. This is known as warm sales leads, which is likely to have higher sales rates than the traditional annoying and inefficient cold calls made in the industry. This is all achieved in by autonomous and automated processing performed by the bot 121 and the CRM service 140.

As another example, in the FIG. 18, the bot 121 receives real-time metrics from the API of the messaging platform and/or mines a history of live metrics for customers that liked a particular page (resource of the site 130) X posted on the enterprise site 130, which in accordance with a configuration from the CRM service 140 or an AI algorithm indicates to the bot 121 that such customers might be interest in product or service Y.

At 1, the bot 121 takes the list of identified customers mined from the history or real-time metrics being presented on the site 130 and iterates the list of potential customers for generating auto-initiated chat sessions with each of the potential customers. The bot 121 provides the initial message as a text or instant message sent through the messaging platform to each customer's messaging platform identifier.

At 2, the bot 121 starts the unsolicited chat session with each customer by stating: "Hi, I saw you like X page. Have you heard about product or service Y?"

Assuming an intention of the customers are favorably inclined based on responses or non-responses of the customers during the auto-initiated chat sessions, the bot 121 post through the API of the CRM service 140 a new potential customer contact including customer contact information and preferences derived, such as X and Y, at 3.

At 4, the CRM service 140 sends the contact information of the potential customers to a sales person operating sales device 160. The sales person, at 5, then operates sales device 150 to engage the customer over the messaging platform 120 or through a different channel (voice call assuming a phone number is available, text message, instant message, etc.).

The traditional cold calling technique is enhanced and delegated to the bot 121 to provide a warm sales lead. The bot 121 engages in auto-initiated chat sessions (conversations) with potential customers online through the messaging platform and only when such customers match a profile or criteria (such as linking, subscribing, liking, downloading a specific web page, and other criteria configured in the bot 121). The bot 121 also autonomously gauges the potential customers interest level from the intent of the customer provided during the conversations. T he bot 121 can then store the intention gleaned from the customer as preferences of the customer and provide the customer contact information and preferences to the CRM service 130. The CRM service 130 can then push the customer contact information and preferences to sales representatives.

This allows businesses or enterprises to automate a substantial portion of their sales process and the sales personnel can spend less time focusing on generating sales leads and traditional cold calling approaches and more time on selling goods and services of the enterprise directly with warm (interested) contacts (the potential customers).

Figure 2:
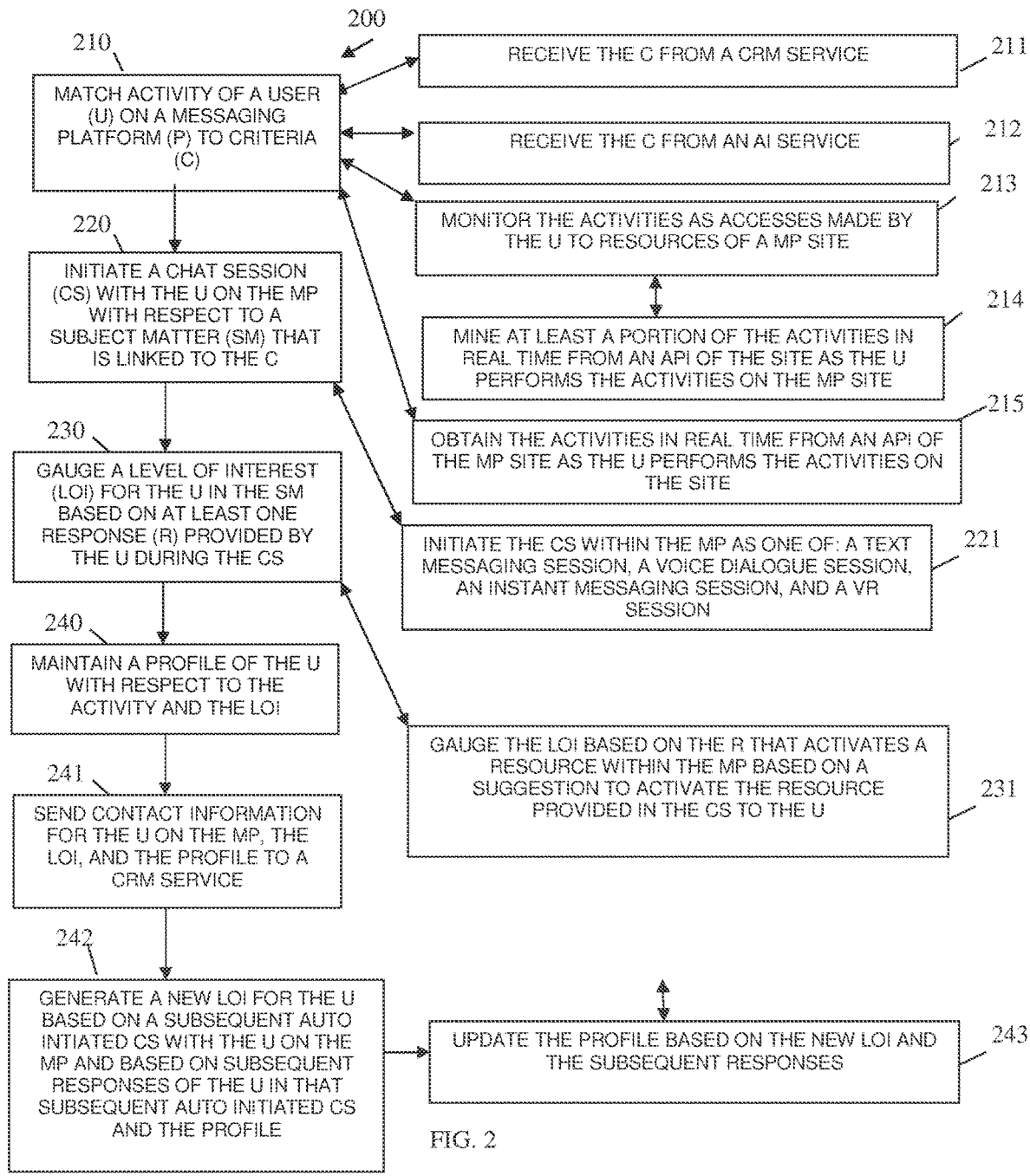
FIG. 2 is a diagram of a method for an auto-initiated messaging chat, according to an example embodiment.
Figure 3:
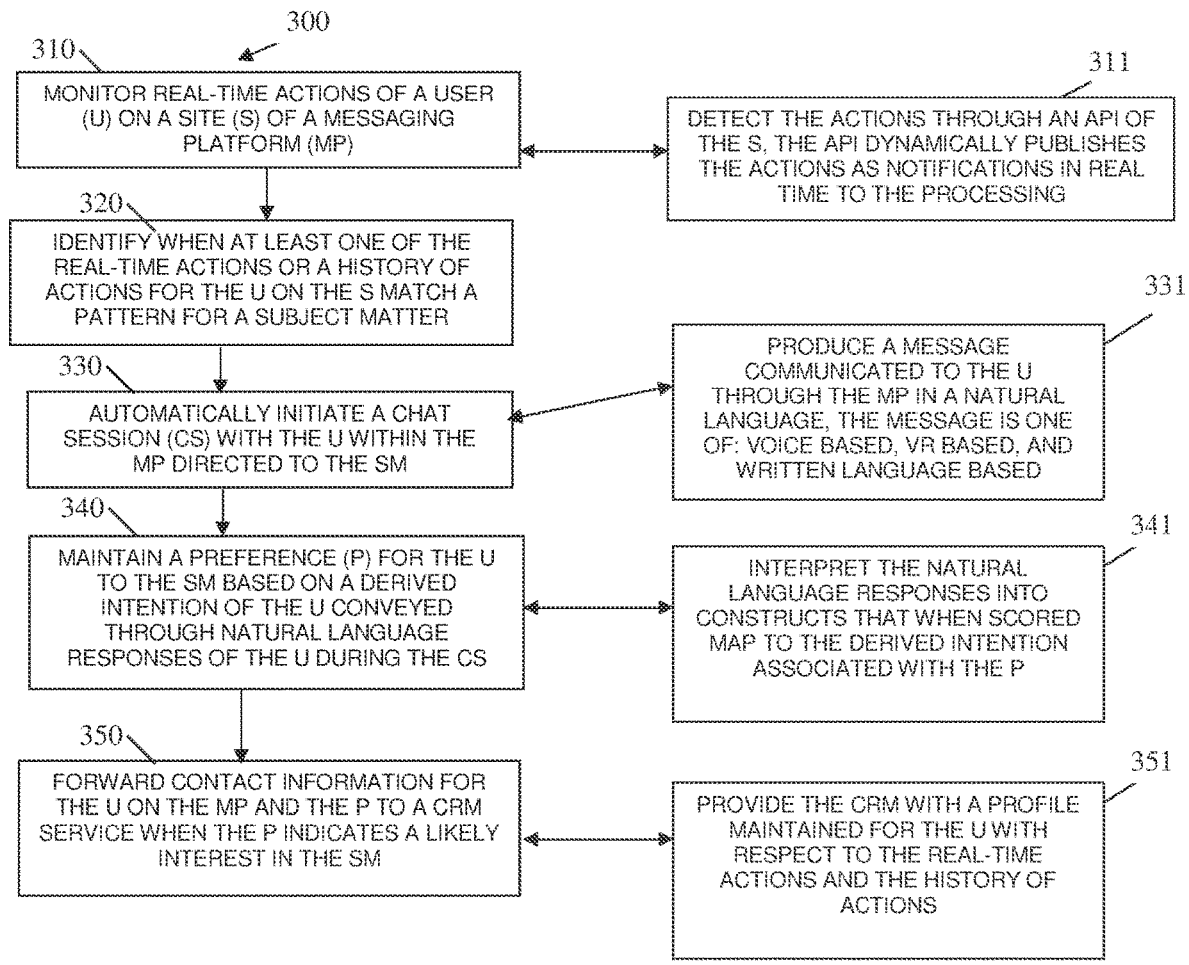
FIG. 3 is a diagram of another method for an auto-initiated messaging chat, according to an example embodiment.
Figure 4:
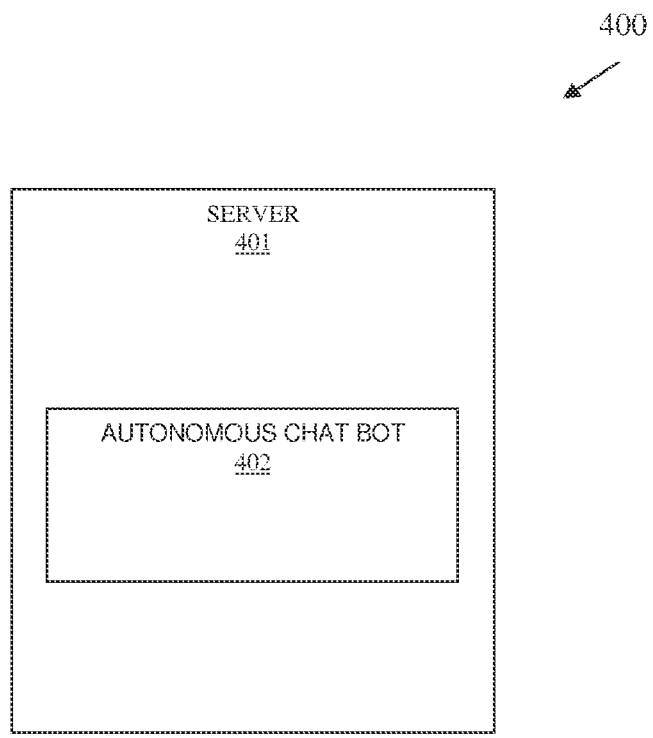
FIG. 4 is a diagram of another system for auto-initiated messaging chats, according to an example embodiment.

These and other embodiments are now presented with reference to the FIGS. 2-4.

FIG 2 is a diagram of a method 200 tor an auto-initiated messaging chat, according to an example embodiment. The software module(s) that implements the method 200 is referred to as an "autonomous chat bot". The autonomous chat dot is implemented as executable instructions programmed and residing within memory and/or a non-transitory computer readable (processor-readable) storage medium and executed by one or more hardware processors of a hardware computing device. The processors of the device that executes the autonomous chat bot are specifically configured and programmed to process the autonomous chat bot. The autonomous chat bot has access to one or more networks during its processing. The networks can be wired, wireless, or a combination of wired and wireless.

In an embodiment, the device that executes the autonomous chat bot is a device or set of devices that process in a cloud processing environment.

In an embodiment, the device that executes the autonomous chat bot is a server.

In an embodiment, the autonomous chat bot the bot 121.

At 210, the autonomous chat bot matches activity of a user on a messaging platform to criteria. The messaging platform can be any of the above-mentioned messaging platforms of the FIGS. 1A-1B. The activity is dynamically reported by an API of the messaging platform tor a site that the user is browsing or visiting within the messaging platform. In an embodiment, the messaging platform is (he messaging platform 120; the site is the site 130; the user operates messaging client 110, and the autonomous chat bots the bot 121.

According to an embodiment, at 211, the autonomous chat bot receives the criteria from a CRM service. In an embodiment, this is achieved through an API that the autonomous chat bot processes to communicate with the CRM service. In an embodiment, the CRM service is the CRM service 140. In an embodiment, the CRM service is out-of-band to the messaging platform where the autonomous chat bot operates and the user performs actions.

In an embodiment, at 212, the autonomous chat bot receives the criteria from an AI service. Again, an AI API configured in the autonomous chat bot permits the autonomous chat bot to receive the criteria for matching.

In an embodiment, the activity of the user within the site of the messaging platform is accesses made or selections pressed within a user-facing interface of the site. For example, the activity can include accessing a page of the site, downloading a file from the site, registering to receive push notifications, following an enterprise associated with the site, accessing an interactive game placed on the site, registering to receive a service of the enterprise, liking or disliking a page or post of the site, posting to the site, and the like.

Accordingly, in an embodiment, at 213, the autonomous chat bot monitors the activities as accesses made by the user to resources of the messaging platform site. The resources can be operations: files, pages, and the like available from the site.

In an embodiment of 213 and at 214, the autonomous chat bot mines at feast a portion of the activities from a history of metrics maintained by the site. The metrics can include any of the metrics available by the messaging platform to the site through a messaging platform API Some example metrics may include, the user's identifier for the messaging platform, resources identifiers for resources accessed, length of time spent by the user on the site or with a particular resource, date and time of access to the site or a particular resource, selectable option identifiers for options that the user selects while interacting with a service available on the site, and the like.

In an embodiment, at 215, the autonomous chat bot obtains the activities in real time from an API of the site (available through the messaging platform). That is, the autonomous chat bot registers wills the API of the messaging platform to receive dynamic real-time push notifications when the activities occur on the site.

In an embodiment, the criteria is a single or a set of selective metric identifiers for the user's activities, in an embodiment, each metric identifier that identifies an activity of the user is scored and when a score for the user reaches a threshold, the activity is deemed to have matched the criteria. In an embodiment, the criteria can include non-activity related conditions that are available through a published profile of the user through the messaging platform, such as gender of the user, age of the user, city and/or state of residence, specifically noted likes and dislikes of the user noted in the user's messaging profile, and the like.

At 220, the autonomous chat bot initiates a chat session with the user on the messaging platform with respect to a subject matter that is linked to the criteria. In an embodiment, the subject matter is a good or service of an enterprise, in an embodiment, the subject matter is a discussion topic designed to learn more about the likes and dislikes of the user. The autonomous chat bot autonomously decides to initiate the chat session in a manner that is unsolicited by the user.

According to an embodiment, at 221, the autonomous chat bot initiates the chat session with the messaging platform as one or more of: a text messaging session, a voice dialogue session, an instant messaging platform, and a VR session.

At 230, the autonomous chat bot gauges a level of interest for the user in the subject matter based on at least one response provided by the user during the chat session.

That is, the chat session is a natural language dialogue between the autonomous chat bot and the user within the messaging platform using the messaging platform's messaging interface. In response to questions posed in the initial chat session by the autonomous chat bot, the user responds in natural language or may take a different action within the messaging platform site (such as updating a profile of the user, registering for a service, etc.). The responses of the user are translated into a normalized format from the user's natural language response as a construct; predefined known values for the construct are then compared against a value for the user's translated construct. Optionally, the construct values representing the user's response can be weighted and scored. The scored value is then mapped to a level of interest along a predefined scale. This is one mechanism for gauging the level of interest tor the user in the subject matter of the chat session that was initialed by the autonomous chat bet.

According to an embodiment, at 231, the autonomous chat bot gauges the level of interest based on the response that activates a resource within the messaging platform based on a suggestion to activate the resource provided in the chat session to the user by the autonomous chat bot during the natural language conversation between the autonomous chat bot and the user. So, the user's response may not be directly provided within the chat session but may occur based on user's actions on the site.

In an embodiment, at 240, the autonomous chat bot maintains a profile of the user with respect to the activity and the level of interest.

In an embodiment of 240 and at 241, the autonomous chat bot sends contact information for the user on the messaging platform, the level of interest, and the profile to a CRM service. In an embodiment, the CRM service is the CRM service 140.

In an embodiment of 241 and at 242, the autonomous chat bot generates a new level of interest for the user based on a subsequent auto initiated chat session with the user on the messaging platform and based on subsequent responses of the user in that subsequent auto initiated chat session and the profile.

In an embodiment of 242 and at 243, the autonomous chat bot updates the profile based on the new level of interest and the subsequent responses.

FIG. 3 is a diagram of a method 2300 for an auto-initiated messaging chat, according to an example embodiment. The software module(s) that implements the method 300 is referred to as a "messaging contact-generating bot." The messaging contact-generating bot is implemented as executable instructions programmed and residing within memory and/or a non-transitory computer-readable (processor-readable) storage medium and executed by one or more hardware processors of a hardware computing device. The processors of the device that executes the messaging contact-generating bot are specifically configured and programmed to process the messaging contact-generating bot. The messaging contact-generating bot has access to one or more networks during its processing. The networks can be wired, wireless, or a combination of wired and wireless.

In an embodiment, the device that executes the messaging contact-generating bot is a device or set of devices that process in a cloud processing environment.

In an embodiment, the device that executes the messaging contact-generating bot is a server.

In an embodiment, the messaging contact-generating bot the bot 121.

The messaging contact-generating bot presents another and in some ways enhanced perspective of the method 200.

At 310, the messaging contact-generating bot monitors real-time actions of a user on a site of a messaging platform. The messaging platform can be any of the messaging platforms 120 discussed above with the FIGS. 1A-1B. In an embodiment, the site is the site 130. In an embodiment, the site is a site maintained by a business or enterprise with the messaging platform.

According to an embodiment, at 311, the messaging contact-generating bot detects the actions through an API of the site tor the messaging platform. The API dynamically publishes the actions as real-time notifications to the messaging contact-generating bot.

At 320, the messaging contact-generating bot identifies when at least one of the real-time actions or a history of actions for the user on the site match a predefined pattern for a predefined subject matter.

At 330, the messaging contact-generating bot automatically and autonomously initiates a chat session with the user within the messaging platform directed to the subject matter.

In an embodiment, at 331, the messaging contact-generating bot provides a message communicated to the user through the messaging platform and its interfaces in a natural language. The message is one of: voice based, VR based, and written language based.

At 340, the messaging contact-generating bot maintains a preference for the user to the subject matter based on a derived intention of the user conveyed through natural language responses of the user during the chat session.

According to an embodiment, at 341, the messaging contact-generating bot interprets the natural language responses into constructs that when scored map lo the derived intention of the user with respect to the subject matter.

At 350, the messaging contact-generating bot forwards contact information for the user on the messaging platform and the preference to a CRM service. The preference indicates a likely interest in the subject matter. In an embodiment, the CRM service is the CRM service 140.

According to an embodiment, at 351, the messaging contact-generating bot provides the CRM service with a profile maintained for the user with respect to the user's real-time actions and the user's maintained history of actions with the site.

FIG. 4 is a diagram of another system 400 for auto-initiated messaging chats, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including an autonomous chat bot 402.

The autonomous chat bot 402 is configured to: 1) execute on at least one hardware processor of the server 401; 2) automatically initiate a messaging chat session with a user based on access of the user to a resources on a site of a messaging platform; and 3) determine a preference of the user with respect to a subject matter of the messaging chat session. In an embodiment, the subject matter is a good or service that is offered for sale by an enterprise associated with the site.

In an embodiment, the autonomous chat bot 402 is further configured to: 4) communicate the preference for the subject matter in real time to a CRM service. In an embodiment, the CRM service is the CRM service 140.

In an embodiment, the autonomous chat bot 402 is further configured, in 2), to engage the user in natural language communications during the messaging chat session.

In an embodiment, the autonomous chat bot 402 is all or some combination of: the bot 121, the method 200, and the method 300.

In an embodiment, the messaging platform is any of the messaging platforms referenced above with the FIGS. 1A-1B.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
monitoring activity of a user on a site;
matching a pattern associated with the activity to a criteria;
obtaining a subject matter linked to the criteria;
automatically initiating an unsolicited natural language chat session with the user relevant to the subject matter over a messaging platform;
determining an interest level of the user based on at least one response received from the user during the unsolicited natural language chat session;
maintaining a score for the interest level and when the score reaches a threshold providing contact information for the user, the score, and the subject matter to an enterprise associated with the site; and
generating a profile for the user based on the activity, the subject matter, the interest level, and the score.

2. The method of claim 1 further comprising iterating to the monitor for each additional user that visits the site associated with the enterprise.

3. The method of claim 2, wherein maintaining further includes maintaining a list of specific users with corresponding scores above the threshold along with corresponding contact information for the specific users and providing the list to a designated individual of the enterprise associated with the subject matter.

4. The method of claim 1 further comprising, updating the profile of the user with the enterprise based on a subsequent activity, a subsequent subject matter, a subsequent interest level, and a subsequent score.

5. The method of claim 1, wherein matching further includes obtaining configuration information to identify the pattern and other patterns based on real-time metrics captured for the activity and other activities of the user and other users.

6. The method of clam 2, wherein monitoring further includes identifying a user identifier for the user on the site.

7. The method of claim 6, wherein identifying further includes linking the user identifier to a user account with the enterprise.

8. The method of claim 7, wherein maintaining further includes obtaining the contact information for the user from the user account.

9. The method of claim 1, wherein maintaining further includes obtaining the contact information for the user during the unsolicited natural language chat session.

10. The method of claim 1, wherein monitoring further includes identifying the activity when the user accesses a predefined resource on the site.

11. A method, comprising:
receiving configuration information to identify activities of users and matching the activities to predefined patterns for an enterprise, wherein each predefined pattern linked to a subject matter within the configuration information;
monitoring users for the activities and the predefined patterns on a messaging platform;
identifying a certain user that is engaged in a given activity with a given pattern on the messaging platform;
automatically initiating an unsolicited natural language chat session with the certain user relevant to a corresponding subject matter associated with the given pattern over the messaging platform;
maintaining a score for an interest level of the certain user during the unsolicited natural language chat session; and
providing contact information for the certain user, the corresponding subject matter, and the score to the enterprise when the score reaches a threshold score during the unsolicited natural language chat session.

12. The method of claim 11, wherein identifying further includes processing an artificial intelligence algorithm to evaluate real-time metrics for the certain user on the messaging platform to match the given activity with the given pattern.

13. The method of claim 11, wherein providing further includes providing enterprise contact information or an enterprise link to an enterprise site to the certain user when the score reaches the threshold score during the unsolicited natural language chat session.

14. The method of claim 11, wherein identifying further includes obtaining previous metrics linked to the certain user from the enterprise, obtaining current metrics associated with the given activity, and matching the given activity to the given pattern based on a combination of the previous metrics and the current metrics for the certain user.

15. The method of claim 11, wherein identifying further includes identifying a reference or an action by the certain user that comments on or attempts to access a resource linked the enterprise on the messaging platform.

16. The method of claim 11, wherein identifying further includes obtaining a user identifier used by the certain user on the messaging platform, obtaining past metrics of the certain user on the messaging platform from the messaging platform using the user identifier, and matching the given activity to the given pattern based on a combination of current metrics associated with the certain user on the messaging platform and the past metrics.

17. The method of claim 11, wherein monitoring further includes receiving real-time metrics from the messaging platform for the users, wherein identifying further includes identifying the given activity for the certain user on the messaging platform based on the real-time metrics associated with a user identifier for the certain user.

18. A system, comprising:
a processor;
a non-transitory computer-readable storage medium comprising executable instructions; and
the executable instructions when executed by the processor from the non-transitory computer-readable storage medium cause the processor to perform operations comprising:
receiving configuration information for an enterprise that defines activities and patterns based on metrics associated with users on a messaging platform, wherein each pattern linked to a subject matter;
receiving user identifiers and real-time metrics of the users who are accessing the messaging platform;
matching a certain user and the real-time metrics of the certain user on the messaging platform to a given activity associated with a given pattern;
obtaining a given subject matter linked to the given pattern within the configuration information;
automatically initiating an unsolicited natural language chat session with the certain user relevant to the given subject matter over the messaging platform;
scoring responses of the user for an interest level in the given subject matter during the unsolicited natural language chat session; and
providing the user identifier for the certain user, the given subject matter, and a current score for the interest level to the enterprise.

19. The system of claim 18, wherein messaging platform is a web site associated with the enterprise or a social media platform independent of the enterprise.

* * * * *